3,077,104
PROCESS FOR DETECTING THE INTERFACE BETWEEN TWO ADJACENT FLUIDS
Frank C. Fowler, 1457-E. 76th Terrace, Kansas City 10, Mo.
No Drawing. Filed May 27, 1959, Ser. No. 816,053
3 Claims. (Cl. 73—53)

The present invention relates to a novel and useful method of detection of the presence of materials and to a composition used therefor. In one aspect my invention relates to a method for detecting the interface between two adjacent fluids when flowing successively through a conduit. In another aspect this invention relates to a method for detecting leaks of fluids from confined areas.

There has been an increasing demand for a method of accurately detecting and measuring the interface separating adjacent products in a product pipeline. The several methods in use can be classified into two groups. One group involves those measuring a property of the product being transported, such as density, flash point or dielectric constant. The other group measures a property of a tracer or marker which is injected into the line at the interface. The marker may be a dye or a radioactive tracer.

The difficulty with measuring a property of the products is that occasionally products with nearly identical properties are adjacent to each other in the pipeline. For instance, it is possible for two gasolines to have almost identical densities or dielectric constants. This situation produces such little change in the measured quantity that an interface cannot be detected. Rarely will large shipments of products be characterized by exactly the same density or dielectric constant because uniform mixing throughout large storage tanks does not exist. Thus, misleading indications of the presence of an interface can occur because of inability to insure complete homogeneity within the storage tanks and transfer lines.

The use of a dye as a marker which depends upon visual or colorimetric measurements has certain disadvantages. Certain products, particularly crude oil, possess color which interferes with visual observations. Measurement of color with colorimetric equipment requires expensive apparatus, costly to install and maintain under field conditions. Radioactive tracers present the problem of adequate safety measures to insure the safety of operators.

An object of this invention is to provide a method for detecting the presence of fluids.

Another object of this invention is to provide a method for detecting different fluids while flowing in a conduit.

Still another object of this invention is to provide a method for detecting leaks of fluids from confined areas.

Still another object of this invention is to provide detecting medium which is miscible and inert with the fluids to be detected.

Still another object of this invention is to provide a detecting medium which is more sensitive and more economical than present media used for detecting the presence of fluids.

Various other objects and advantages will become apparent to those skilled in the art from the accompanying description and disclosure.

According to the present invention, a halogenated hydrocarbon is injected into the final portion of the leading fluid or the initial portion of the flowing fluid in a conduit in which the fluids are flowing successively through said conduit. Equipment capable of detecting the halogenated hydrocarbon is located downstream from the point of injection. As the interface containing the halogenated hydrocarbon passes the detecting equipment, the presence of the interface is detected. The halogenated hydrocarbon serves as a quantitative marker for the interface or mixture separating two adjacent fluids.

In another aspect of this invention, the halogenated hydrocarbon is admixed with the fluid to be transported through the conduit. If any leaks are present in the conduit for transporting the fluid, portable detecting equipment is passed along the conduit to detect the presence of the halogenated hydrocarbon. Very minute quantities of the halogenated hydrocarbon can be detected thereby indicating the presence of a leak in the conduit.

The halogenated hydrocarbon used as the detecting medium may be partially or completely halogenated; and preferably, the halogens are selected from the group consisting of fluorine and chlorine. The halogenated hydrocarbon should be miscible with the fluids to be transported when in the liquid phase. That is, the halogenated hydrocarbon should be soluble in the liquid fluid to be transported in the amounts necessary for proper detection. Preferably, the halogenated hydrocarbon is normally gaseous material. Suitable examples of halogenated hydrocarbon are those containing fluorine or chlorine or both, having not more than three carbon atoms per molecule. However, halogenated hydrocarbon of longer chain length may be used without departing from the scope of this invention. Typical examples of the halogenated hydrocarbon include dichlorodifluoromethane, dichloromonofluoromethane, trichloromonofluoromethane, trichlorotrifluoroethane, and dichlorotetrafluoroethane. Since for the best detection process it is desirable that the halogenated hydrocarbon be in the vapor phase, the above compounds are particularly useful since they are normally gaseous. However, any halogenated hydrocarbon which is volatilizable is usable, such as chloroform, carbon tetrachloride, and tetrachloroethylene, which are normally liquid but volatilizable. Mixtures of the halogenated hydrocarbon may be used without departing from the scope of this invention. Such mixtures are particularly desirable to provide a vapor pressure of the detecting medium corresponding substantially to the vapor pressure of the fluid to be transported. A particularly desirable mixture is a mixture of dichlorodifluoromethane and dichlorotetrafluoroethane in equal molar proportions when used as a detection medium for transporting hydrocarbon.

The detection medium should be present in an amount at least 0.1 p.p.m., and preferably, an amount between about 25 and about 500 p.p.m. In these proportions the halogenated hydrocarbon is usually miscible with most organic fluids. In most instances, it is unnecessary to use much more than 100–150 p.p.m. of the halogenated hydrocarbon for detection purposes. In the case of detecting leaks in conduits in which the fluid is being held, as small as 1–10 p.p.m. of the halogenated hydrocarbon is all that is required.

The present invention is particularly useful in transporting hydrocarbons, particualriy in the transportation of petroleum oils and distillates. For example, the present invention applies to transporting crude oil, gasolines, kerosenes, diesel oil, fuel oil and various petroleum distillates. The invention also is applicable to the transportation of other organic chemicals, such as alcohol, ethylene, propane and ethylene glycol.

The invention applies particularly to the transportation of various petroleum liquids and fractions. For example, in the transportation of crude oil it is necessary often to detect the difference between crude oil supplied by different suppliers or to indicate the crude oil to different customers. In addition, different products in quality and grade may be transported through the same conduit, but their physical and chemical properties are so closely similar that it is difficult to detect the interface. The present invention, therefore, is an economical and sensitive method for detecting the interface between similar petroleum products, such as two different gasolines or gasoline and kerosene, etc. In this respect, in transporting gasolines the halogenated hydrocarbon mentioned above is inert and has no effect upon the anti-knock properties of the gasoline when used in the proportions set forth above.

The detecting equipment would function by diverting a small stream as a vapor from the conduit or pipeline to the measuring element. One typical method of detecting halogenated hydrocarbons, such as the fluorine-containing Freons, is based upon the principle that a heated platinum surface emits substantially larger numbers of ions in the presence of halogen gases. Suitable equipment of this nature is available on the open market and one such equipment is sold by the General Electric Company as G.E.–C233G leak detector used for detecting Freons. Another useful method is to take advantage of the green color imparted to the burning flame of hydrocarbons by the presence of halogen. Thus, a small sample of a flowing hydrocarbon in the conduit may be burned to indicate the presence of halogens.

Several methods may be used for converting the liquid stream in the conduit to vapor to be passed through the detecting equipment. Among these are:

(1) Vaporization by application of heat
(2) Flashing by reduction in pressure
(3) Stripping by inert gas such as nitrogen
(4) Combustion of liquid with measurement on the flue gases Any of the above methods may be used to produce the desired results. Sensitivity, safety and economy dictate their choice.

The Freons as the detecting media offer a wide range of boiling points which, in turn, permit a wide choice of methods for injection and detection. Choice of different Freons allows variation of the sensitivity required in detection. The most urgent need for better methods of detection is in product pipelines, where the principal products to be transported are gasoline and light distillates. The use of Freons as a detecting media is adaptable to a wide variation of petroleum products from methane through crude oil. As a matter of fact, of the current methods in use, none seems well suited to the identification of crude oil interfaces. Freons can be used quite satisfactorily in crude oil lines. Increasing use of pipelines for shipment of chemicals is being made. The Freons will perform well in most applications of chemical shipments.

Freons or halogenated hydrocarbons offer some important advantages when used as markers. First of all, they are completely miscible with hydrocarbons and many other chemicals in the ranges under consideration. Specifically in the transportation of petroleum products by pipelines, small quantities used in this invention do not affect the specifications or the use of the products. Many of the Freons possess the added advantage of being non-toxic and nonflammable.

A Freon or a mixture of Freons selected for a given identification would be injected at a specific rate, depending upon the concentrations desired in one of the two adjacent products. For instance, Freon–12 could be injected into the gasoline at the rate such that the concentration would be 100 p.p.m. Freon–12 in the gasoline. This would be done in one of the two adjacent gasolines being pumped through pipelines. If gasoline A were being pumped into a pipeline followed by gasoline B, then the interface between the two gasolines would be a mixture of A and B. Consider that the Freon were injected in the last portion of the gasoline A as it was being pumped into the pipeline. The measuring instrument, located at the next station, would indicate zero p.p.m. Freon at first. Then the measuring element would detect increasing amounts of Freon in gasoline A as the interface approached that station. If sufficient quantity of gasoline had been marked, then the Freon concentrations would gradually rise to the concentration at which it was injected. In this example, the value would be 100 p.p.m. As the interface passed the measuring station, the Freon concentration would decrease again, reaching zero when all of the mixture had passed. Similar results are also obtained by injection of the Freon into the first portion of gasoline B. Still another method involves injection of a concentrated quantity of Freon at the interface for a shorter time. Detection elements located downstream would give a zero reading followed by a rapidly increasing reading to a maximum value. The value would then decrease rapidly to zero again.

A Freon flag would not be affected by contamination from line-fills, line-traps or leaking valves. This factor gives erroneous results when using the physical property of the products as a means of identification.

Besides identifying the interface, the use of Freon flags offers a very sensitive method of detecting small leaks from the pipeline. Concentrations of less than 1 p.p.m. Freon in air may be easily detected. The use of the more volatile Freons increases the concentration of Freon in air resulting from a pipeline leak.

As a specific example of the operation of this invention in the transportation of two different batches of gasolines through a 100 mile long 8 inch pipeline at the source of supply, 100 p.p.m. of Freon–12 is injected into 300 barrels of the first batch of gasoline at the end of the supply of such gasoline and before the supply of the second batch of gasoline. This corresponds to about one mile of injection in the pipeline. At the end of the 100 mile pipeline more than 300 barrels of gasoline will be marked by the Freon due to diffusion. The detection equipment will first indicate 0 p.p.m. of the Freon and gradually indicate higher quantities until it reaches about 100 p.p.m. This will allow sufficient time for the operator to be ready to mark the change in the interface. Then, when the detection equipment starts to indicate a decreasing Freon concentration, the operator will know that the interface has arrived.

Various modifications and alterations of the quantity and means of detection may become obvious to those skilled in the art without departing from the scope of this invention.

Having described my invention, I claim:

1. A method for detecting the interface between two adjacent batches of gasoline successively flowing through a conduit which comprises injecting a miscible fluorinated hydrocarbon adjacent to said interface in an amount between about 0.1 and about 500 p.p.m. of the gasoline and subsequently downstream from the point of injection removing a portion of the gasoline containing said fluorinated hydrocarbon, vaporizing said portion of the gasoline thus removed and determining the presence of fluorinated hydrocarbon in said gasoline.

2. The process of claim 1 in which said fluorinated hydrocarbon is a mixture of dichlorodifluoromethane and dichlorotetrafluoroethane.

3. A method for detecting the interface between two adjacent batches of hydrocarbons successively flowing through a conduit which comprises injecting a miscible fluorinated hydrocarbon adjacent to said interface in an amount between about 0.1 and about 500 p.p.m. of the hydrocarbon and subsequently downstream from the point of injection removing a portion of the hydrocarbon containing said fluorinated hydrocarbon, vaporizing said portion of the hydrocarbon thus removed and determining the presence of fluorinated hydrocarbon in said hydrocarbon.

References Cited in the file of this patent
UNITED STATES PATENTS 1,090,737    McDonald _____ Mar. 17, 1914

(Other references on following page)

UNITED STATES PATENTS

| | | |
|---|---|---|
| 1,693,737 | Weldon | Dec. 4, 1928 |
| 2,631,242 | Metcalf | Mar. 10, 1953 |
| 2,631,929 | Thorpe et al. | Mar. 17, 1953 |
| 2,775,120 | Bennett et al. | Dec. 25, 1956 |
| 2,784,160 | Blaker | Mar. 5, 1957 |
| 2,868,625 | Frank | Jan. 13, 1959 |

OTHER REFERENCES

General Electric Review. October 1949, pages 41–44, article by J. R. Neff.